(12) United States Patent
Richardson (10) Patent No.: US 8,459,593 B2
(45) Date of Patent: Jun. 11, 2013

(54) AERIAL REFUELING DROGUE DEPLOYMENT SYSTEM

(75) Inventor: Forrest Eugene Richardson, Wichita, KS (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 13/117,586

(22) Filed: May 27, 2011

(65) Prior Publication Data

US 2012/0298805 A1 Nov. 29, 2012

(51) Int. Cl.
  *B64D 39/02* (2006.01)
  *B64D 37/04* (2006.01)
  *G05G 1/44* (2008.04)

(52) U.S. Cl.
  USPC .............. 244/135 A; 244/135 R; 244/1 TD; 74/503; 74/504; 74/505; 74/506

(58) Field of Classification Search
  USPC ... 244/135 A, 135 R, 136, 1 TD; 74/503–506
  See application file for complete search history.

(56) References Cited

U.S. PATENT DOCUMENTS

| | | | |
|---|---|---|---|
| 2,879,017 A | 3/1959 | Smith | |
| 3,091,419 A * | 5/1963 | Mosher | 244/135 A |
| 5,141,178 A * | 8/1992 | Alden et al. | 244/135 A |
| 5,573,206 A | 11/1996 | Ward | |
| 5,906,336 A * | 5/1999 | Eckstein | 244/135 A |
| 6,786,455 B1 * | 9/2004 | Bartov | 244/135 A |
| 7,472,868 B2 * | 1/2009 | Schuster et al. | 244/135 A |
| 7,837,151 B1 * | 11/2010 | Garcia, Jr. | 244/135 A |
| 8,074,931 B2 * | 12/2011 | Schroeder | 244/135 A |

* cited by examiner

*Primary Examiner* — Joseph W Sanderson
*Assistant Examiner* — Michael Wang
(74) *Attorney, Agent, or Firm* — Hope Baldauff, LLC (57) ABSTRACT

Systems and methods provide for a drogue deployment system that may be removably attached to a non-tanker aircraft to modify the aircraft for providing aerial refueling operations. Aspects of the disclosure provide a drum unit that may be secured in a cargo area of the non-tanker aircraft and connected to the fuel system of the aircraft. A drogue deployment unit may be removably attached to an external surface of the aircraft fuselage and includes a drogue extension tube that may be selectively deployed outward from the fuselage to provide separation between a refueling drogue and the aircraft. The drogue and corresponding refueling hose may be deployed from a drogue container attached to the drogue extension tube and extended rearward for providing fuel to a receiving aircraft.

18 Claims, 7 Drawing Sheets

AERIAL REFUELING DROGUE DEPLOYMENT SYSTEM

BACKGROUND

Tanker aircraft are conventionally configured with a primary purpose of refueling other aircraft inflight. Due to this mission, conventional tanker aircraft are designed and manufactured to maximize the quantity of fuel stored, which includes accommodating multiple large fuel storage tanks and the corresponding fuel transfer infrastructure for refueling aircraft inflight. While aerial refueling operations are often desirable for military and potentially civilian purposes, the cost of dedicated tanker aircraft can be significant considering that the tanker aircraft may not be practical or ideally configured for missions apart from aerial refueling operations.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a drogue deployment system that can be readily installed and removed as desired to convert a passenger or cargo aircraft for use in providing aerial refueling operations. According to one aspect, a drogue deployment system for providing a non-tanker aircraft with aerial refueling capabilities includes a drum unit and a drogue deployment unit. The drum unit may be removably attached to the fuel system of the non-tanker aircraft. The drum unit includes a drum around which a refueling hose may be stowed. The drum can rotate in one direction to retract the refueling hose and in an opposite direction to deploy the refueling hose. The drogue deployment unit may be removably attached to the fuselage of the non-tanker aircraft. The drogue deployment unit may include a drogue extension tube and a drogue container. The drogue extension tube is rotatably attached to a fixed structure at a pivot end and to the drogue container at an opposite end. The drogue extension tube and the drogue container guide the refueling hose from the drum unit to a deployed position outside of the non-tanker aircraft.

According to another aspect, a method for providing aerial refueling operations from a non-tanker aircraft includes rotating a drogue extension tube downward from a stowed position that is parallel to the fuselage of the aircraft to a deployed position. A refueling hose is extended from a drum unit that is secured within a cargo area of the aircraft, through the drogue extension tube, and through a drogue container attached to the end of the drogue extension tube. Extending the refueling hose extends a drogue attached to the end of the refueling hose rearward to a deployed position behind the aircraft. Fuel is then transferred from a fuel tank of the non-tanker aircraft through the refueling tube to the drogue for receipt by a refueling probe of an aircraft being refueled in flight.

According to yet another aspect, an aircraft configuration includes a fuselage with a pressurized cargo area, wings attached to the fuselage, a fuel system with a number of fuel tanks within the fuselage or wings, a drum unit attached to the fuel system, a drogue deployment unit, a refueling hose with drogue, and a control unit that provides deployment and retraction control for a drogue extension tube and refueling hose. The drum unit may include a drum that rotates in opposite directions to retract or deploy the refueling hose. The drogue deployment unit may include an actuation mechanism housing that is removably attached to an external surface of the fuselage. The drogue deployment unit may also include the drogue extension tube rotatably connected at a pivot end to the actuator mechanism housing and a drogue container attached to the end of the drogue extension tube opposite the pivot end. The drogue extension tube and the drogue container guide the refueling hose from the drum unit to a deployed position beneath and rearward of the aircraft fuselage.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to an aerial refueling drogue deployment system that may be retrofitted to conventional passenger and cargo aircraft to temporarily convert the aircraft for use as a tanker. As discussed above, since conventional tanker aircraft are not practical for transporting passengers and/or cargo in an efficient manner, tanker aircraft that are dedicated to aerial refueling duty may be a costly solution when aerial refueling is not a consistent concern.

Utilizing the concepts and technologies described herein, a drogue deployment system may be temporarily installed within a traditional passenger or cargo aircraft to convert the aircraft for use as an aerial refueling tanker. When refueling missions are complete, the drogue deployment system may be readily removed, returning the aircraft to a passenger or cargo transport configuration. In this manner, the drogue deployment system provides a solution to a need for part-time aerial refueling capabilities at significantly less cost than purchasing and maintaining a dedicated tanker aircraft.

In the following detailed description, references are made to the accompanying drawings that form a part hereof, and which are shown by way of illustration, specific embodiments, or examples. Referring now to the drawings, in which like numerals represent like elements through the several figures, an aerial refueling drogue deployment system and method for installing and employing the same according to the various embodiments will be described.

Figure 1:
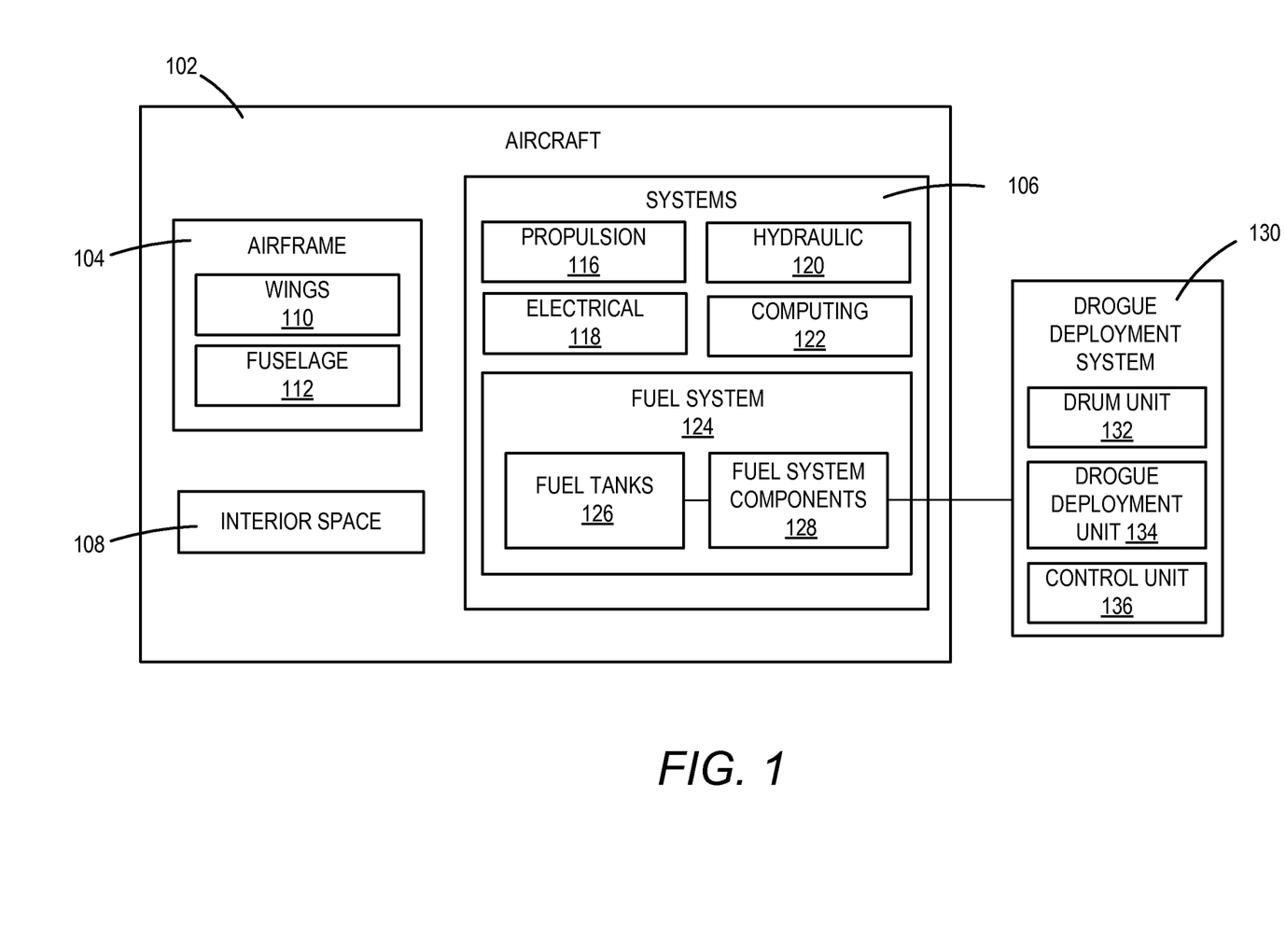
FIG. 1 is a block diagram of a non-tanker aircraft and drogue deployment system according to various embodiments presented herein.

FIG. 1 shows a simplified diagram of a non-tanker aircraft 102 and corresponding drogue deployment system 130 according to the embodiments described herein. For the purposes of this disclosure, the "non-tanker" aircraft 102 (generally referred to below as "aircraft 102") may be any conventional passenger or cargo aircraft having been designed primarily for operations that do not include aerial refueling, but is capable of modification to perform aerial refueling operations utilizing the systems and methods described below. The aircraft 102 may include an airframe 104, a number of systems 106, and an interior space 108. The airframe 104 includes aircraft wings 110 and a fuselage 112. Examples of high-level systems 106 include, but are not limited to, a propulsion system 116, an electrical system 118, a hydraulic system 120, and a computing system 122. The computing system 122 may be functional to control any of the other aircraft systems 106 in the manners described below.

The aircraft 102 includes a fuel system 124 having any number of fuel tanks 126 and fuel system components 128. The fuel system components 128 may include any type and number of components used to provide fuel from the fuel tanks 126 to the propulsion system 116, including but not limited to, fuel lines, pumps, sensors, valves, vents, and any other necessary or desired fuel system elements. According to the embodiments described herein, a drogue deployment system 130 may be temporarily attached to the aircraft fuel system 124 to provide the aircraft with aerial refueling capabilities. As will be described below, components of the drogue deployment system 130 may be attached to the exterior of the fuselage 112, as well as having components disposed within the interior space 108.

It should be appreciated that for the purposes of this disclosure, a "temporary attachment" or coupling of components refers to components that may be secured together using bolts, screws, fasteners, or any other securing means that would allow for repeated installation and removal of the components according to the currently assigned mission of the aircraft. Similarly, "permanent attachment" may refer to the coupling of components that will remain coupled together for all missions of the aircraft, both conventional uses and aerial refueling uses. For example, as will be described below, the primary components of the drogue deployment system 130 may be temporarily attached to the aircraft 102 to enable aerial refueling capabilities, while some minor components, such as fuel lines that couple the drogue deployment system 130 to the aircraft fuel tanks 126 may be permanently attached so that they remain with the aircraft 102 during all operations.

The drogue deployment system 130 may include any number of components, but for the purposes of this disclosure, will be discussed with respect to three units. Specifically, the drogue deployment system 130 may include a drum unit 132, a drogue deployment unit 134, and a control unit 136. As will be discussed in greater detail below, the drum unit 132 may include a retraction and deployment mechanism for the drogue hose, as well as any associated fuel pumps, pressure regulators, and control mechanisms. The drum unit 132 may be palletized and capable of rolling on and off the aircraft as needed. The drogue deployment unit 134 may be temporarily attached to the fuselage 112 and configured to rotate downward and away from the aircraft 102 to allow for separation between the drogue and the aircraft for deployment of the drogue during refueling operations. The control unit 136 may be a "suitcase" style control unit that provides the Aerial Refueling Operator (ARO) with all control functions for the drogue deployment system 130.

Figure 2:
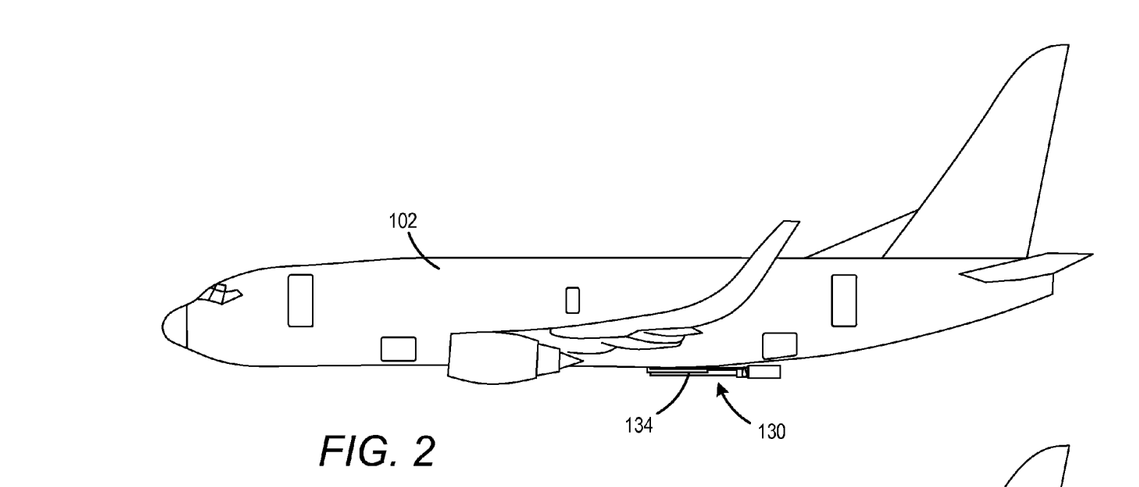
FIG. 2 is a side view of a non-tanker aircraft showing a drogue deployment system in a stowed configuration according to various embodiments presented herein.
Figure 3:
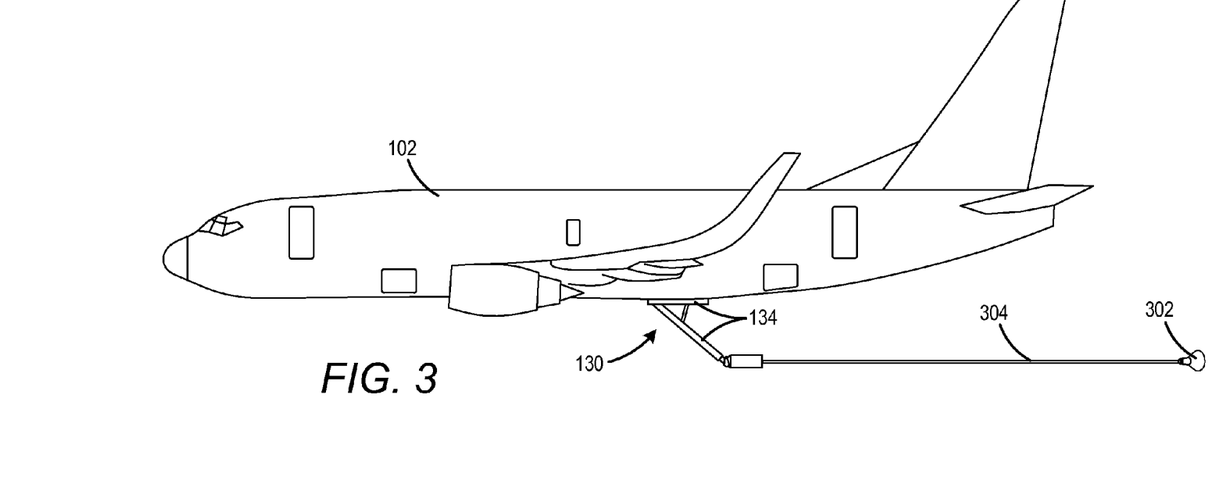
FIG. 3 is a side view of a non-tanker aircraft showing a drogue deployment system in a deployed configuration according to various embodiments presented herein.

FIG. 2 shows a side view of an aircraft 102 with an installed drogue deployment system 130 in a stowed configuration according to various embodiments described herein. This example shows the drogue deployment system 130 in the stowed configuration in which the drogue deployment unit 134 is retracted against the external surface of the fuselage 112. FIG. 3 shows the aircraft 102 with the drogue deployment system 130 in a deployed configuration. When deployed, portions of the drogue deployment unit 134 extend downward away from the fuselage 112 to create a separation between the unit and the aircraft 102. The drogue 302 is positioned at a distal end of the refueling hose 304 and is configured to receive a corresponding refueling probe of an aircraft receiving fuel. The refueling hose 304 is unrolled, or otherwise deployed, from the drum unit 132 and extends from the distal end of the drogue deployment unit 134 to extend the drogue 302 rearward to a distance and position with respect to the aircraft 102 that is safe for refueling operations. The specific components and operational details of the drogue deployment system 130 will now be discussed in greater detail with respect to FIGS. 4-8.

Figure 4:
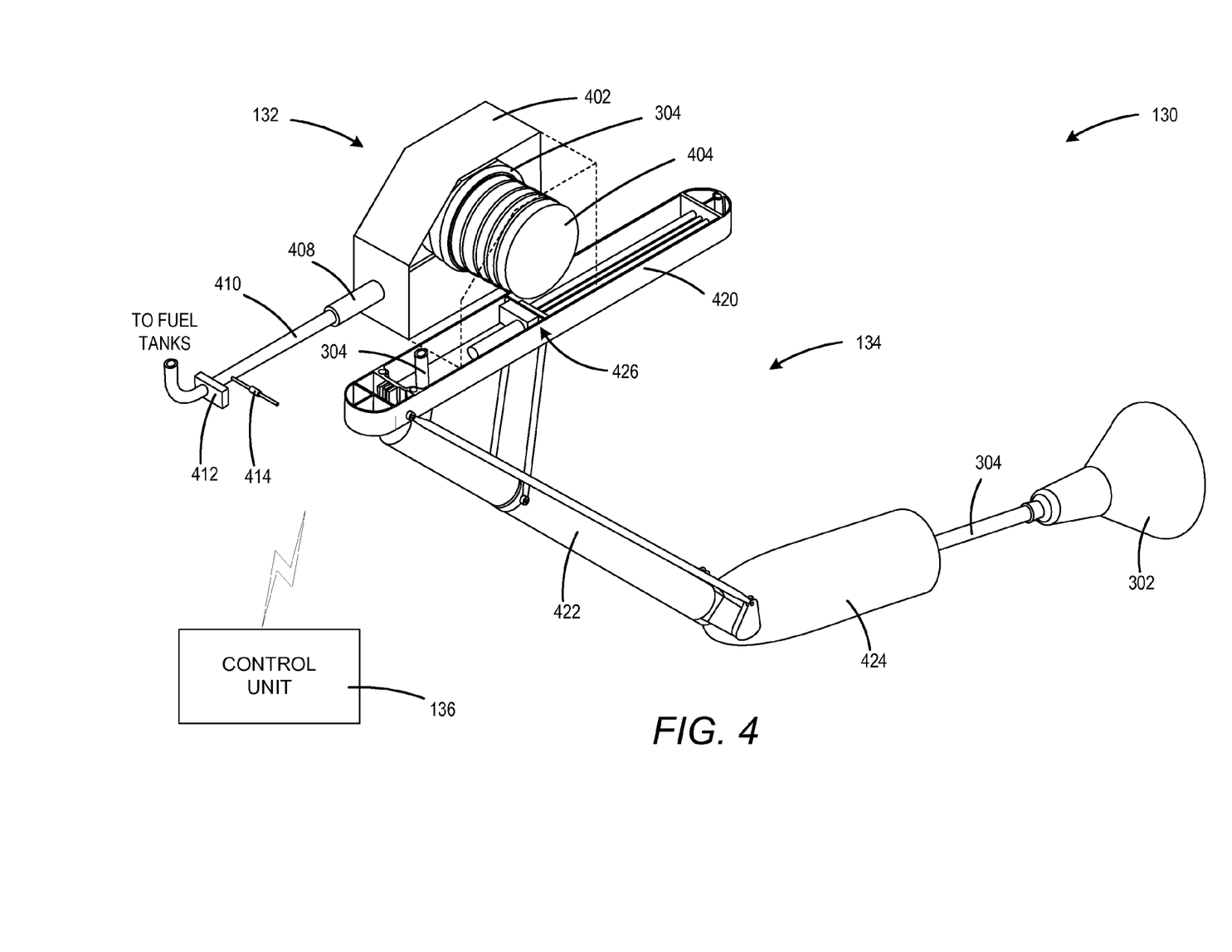
FIG. 4 is a perspective view of a drogue deployment system in a deployed configuration according to various embodiments presented herein.

Turning to FIG. 4, a perspective view of the drogue deployment system 130 is shown according to various embodiments. As described above, the drogue deployment system 130 may include a drum unit 132, a drogue deployment unit 134, and a control unit 136. The drum unit 132 may include a housing 402 that encompasses a drum 404. The drum 404 may be driven by a motor, drum actuator, or other actuation mechanism (not shown) to selectively rotate in opposite directions to alternatively unroll and roll a refueling hose 304 that is coiled around the drum 404. Unrolling the refueling hose 304 allows the drogue 302 to deploy rearward into position for refueling a receiving aircraft. Rotating the drum 404 in a direction that rolls the refueling hose 304 retracts the drogue 302 into a stowed position abutting or within a drogue container 424.

The drogue deployment unit 134 includes an actuation mechanism housing 420, a drogue extension tube 422, the drogue container 424, and the drogue 302, as well as various other actuation and linkage components described below. The actuation mechanism housing 420 may include any number and type of actuation components 426 that are configured to selectively deploy and retract the drogue extension tube 422. Example actuation components 426 will be described below with respect to the embodiment shown in FIG. 5.

According to various implementations, the drum unit 132 may be configured in a relatively compact shape and size within the housing 402 to allow the drum unit 132 to be palletized for quick and efficient loading and installation within the cargo space or other interior space 108 of a passenger or cargo aircraft 102. The housing 402 may include the appropriate fuel line fittings and electrical/communication connections to couple the palletized drum unit 132 to the fuel system 124 of the aircraft 102, as well as to the installed drogue deployment unit 134 and control unit 136. According to one embodiment, the drum unit 132 may be positioned within the aft lower lobe cargo area of the aircraft 102 and connected to the center wing fuel tank 126 via fuel system plumbing. The fuel system plumbing may incorporate a permanently or fixedly installed single-walled fuel manifold 410 that is installed within the unpressurized portions of the aircraft 102. The single-walled fuel manifold 410 provides a passage for the fuel from the center wing fuel tank 126 to a fitting within the applicable pressurized cargo area.

According to various embodiments, the single-walled fuel manifold 410 is removably coupled to the refueling hose 304 within the drum unit 132 in the pressurized lower lobe cargo area via a double-walled fuel manifold 408. The removable double-walled fuel manifold 408 may be located between the forward wall of the cargo area and the drum unit 132 such that the drum unit 132 may be rolled or otherwise loaded into the cargo area, and then connected to the single-walled fuel manifold 410 within the unpressurized area of the aircraft 102 utilizing the removable double-walled fuel manifold 408. It should be appreciated that the double-walled fuel manifold 408 may be permanently coupled to the drum unit 132 and removably coupled to the single-walled fuel manifold 410, or may be removably coupled to both the single-walled fuel manifold 410 and the drum unit 132. Any type of known coupling mechanisms may be utilized for removably coupling components as described above. It should also be understood that the fuel manifolds and other components may be single walled or double walled within the scope of this disclosure and are described as being single walled or double walled due to their respective positioning within unpressurized and pressurized portions of the aircraft 102, respectively, according to current safety regulations and/or practices.

A shutoff valve 412 may be positioned within the fuel system 124 in the unpressurized area to control the flow of fuel from the center wing fuel tank 126 to the drum unit 132. In addition, a vacuum relief check valve 414 and associated plumbing may be installed in the unpressurized area to allow for drainage of fuel contained within the single-walled fuel manifold 410 when the shutoff valve 412 is closed. Although a shutoff valve 412 and vacuum relief check valve 414 are shown and described herein, any type and number of fuel system components 128 may be utilized with respect to permanent installation within the aircraft 102 and/or temporary installation with the drogue deployment system 130 to facilitate fuel transfer between the aircraft fuel tanks 126 and the drogue deployment system 130. Similarly, the drum unit 132 may further include any number and types of fuel pumps, pressure regulators, and other suitable control mechanisms for controlling the delivery of fuel from the aircraft fuel tanks 126 and through the refueling hose 304 to the drogue 302.

The drogue deployment system 130 may be communicatively coupled to the control unit 136. This coupling may be wired or wireless. As described briefly above, the control unit 136 according to one implementation includes a suitcase-style configuration in which the controls or the drogue deployment system 130 are located within a self-contained, portable case or other packaging. In this manner, the control unit 136 may be referred to as "portable." The control unit 136 may include a laptop computer or other processing means, as well as any number and type of associated input or output devices such as a mouse, a joystick, and control activation buttons for controlling the deployment and retraction of the drogue extension tube 422 and the refueling hose 304 and corresponding drogue 302. The control unit 136 may be utilized to control power input to the drogue deployment system 130 and associated one or more pumps, valves, pressure regulators, motors, actuators, and other associated components utilized to control the drogue deployment system 130 in the manner described herein. For example, the control unit 136 may be operative to activate and deactivate the drum actuation mechanism for deploying and retracting the refueling hose 304, and similarly operative to activate and deactivate the drogue extension tube actuation mechanism for deploying and retracting the drogue extension tube 422.

According to various embodiments, the control unit 136 may be "plugged in" within the aircraft cockpit or other desired location in order to communicate with the various components of the drogue deployment system 130 to allow the ARO to control deployment, retraction, fuel transfer, and any other operations of the drogue deployment system 130. According to one embodiment, a cable bundle may be installed within the aircraft 102 that spans between the cockpit or desired ARO working location and the cargo area in which the drum unit 132 will be secured, which is proximate to the fuselage location in which the drogue deployment unit 134 will be installed. When these drogue deployment system 130 components are installed, they may simply be plugged into the cable bundle (not shown) to provide communications capability between the control unit 136 and the other drogue deployment system 130 components. The control unit 136 may be plugged into the onboard electrical power. By including all communication and control cables within the cable bundle, the drogue deployment system 130 does not interface with the aircraft 102 except for powering the various system components. In this manner, design, fabrication, procurement, and training costs are minimized. The various embodiments may additionally include one or more cameras at the drogue deployment unit 134 to provide real time visual confirmation of the deployment and retraction status of the drogue extension tube 422, refueling hose 304, and drogue 302. Any number and type of sensors may be utilized to monitor the status of the various drogue deployment system 130 components and to alert the ARO accordingly. These video and/or audio components may communicate with the control unit 136 via the above-described cable bundle. The control unit 136 will be described in further detail below with respect to FIG. 8.

Figure 5:
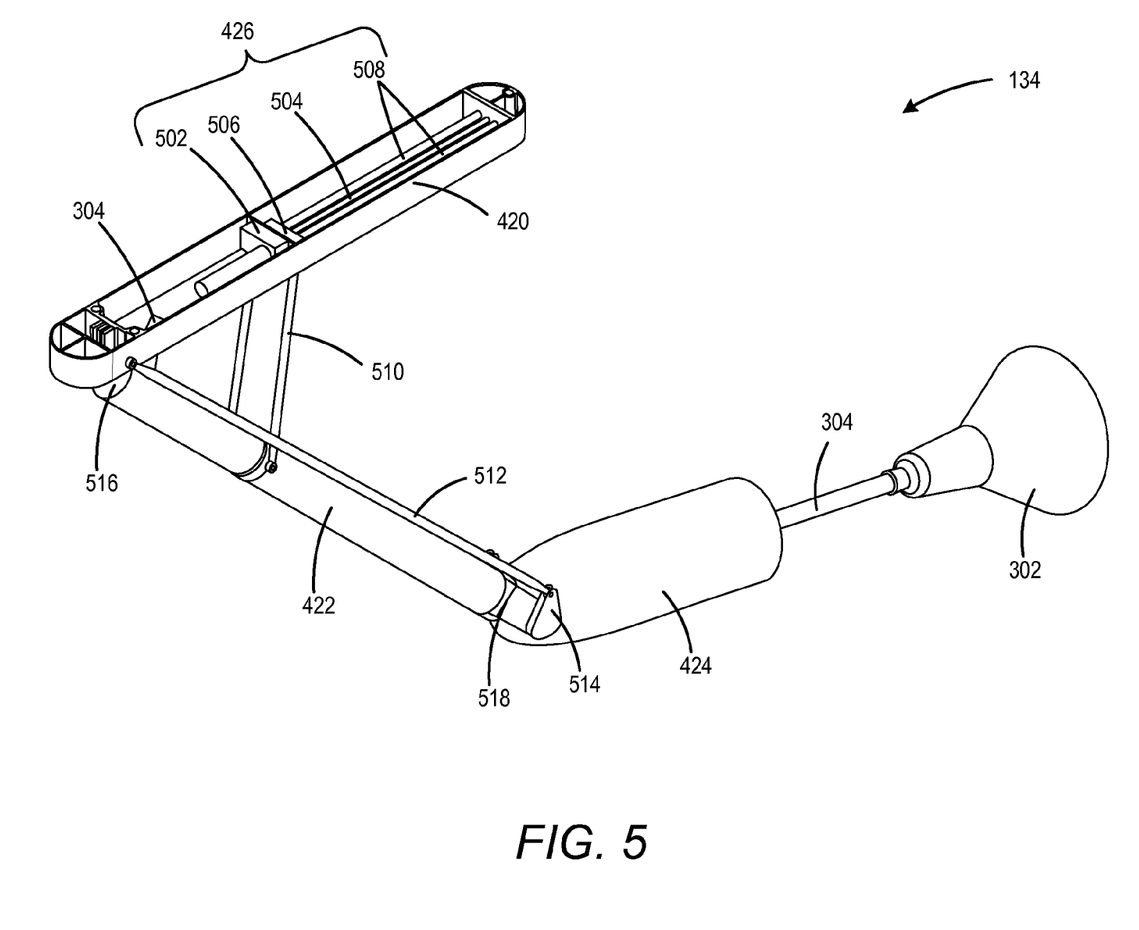
FIG. 5 is a perspective view of a drogue deployment unit in a deployed configuration according to various embodiments presented herein.

Turning now to FIG. 5, a perspective view of the drogue deployment unit 134 is shown. As previously mentioned, the drogue deployment unit 134 includes the actuation mechanism housing 420, a drogue extension tube 422, the drogue container 424, and the drogue 302, as well as any number and type of actuation components 426 that are configured to selectively deploy and retract the drogue extension tube 422. According to various embodiments, the actuation components 426 may include an actuator 502 that rotates a drive screw 504. The drive screw 504 drives a carriage assembly 506 linearly along guide rods 508. Two extension rods 510 are coupled at one end to the carriage assembly 506 and at opposing ends to the drogue extension tube 422. The actuator 502 may be electric, or may alternatively be a hydraulic, pneumatic, electromagnetic, or any other type of suitable actuation device.

When the drogue deployment unit 134 is in the stowed configuration and the actuator 502 is activated, the drive screw 504 rotates in a direction that moves the carriage assembly 506 along the guide rods 508 toward the actuator 502. Doing so applies a force to the extension rods 510 connected to the carriage assembly 506. Because the drogue extension tube 422 is rotatably attached to the actuation mechanism housing 420 at a fixed pivot end 516, the force applied to the extension rods 510 rotates the drogue extension tube 422 downward away from the actuation mechanism housing 420 and the aircraft 102.

According to various embodiments, when the drogue extension tube 422 rotates downward, the drogue container 424 attached to the distal end 518 of the drogue extension tube 422 pivots to maintain an orientation substantially parallel with the ambient airflow. To maintain the orientation of the drogue container 424 while the drogue extension tube 422 is rotating between the stowed and deployed configurations, the drogue deployment unit 134 may contain one or more drogue container rods 512. The drogue container rods 512 are rotatably attached at one end to the actuation mechanism housing 420 and at opposing ends to aft pivot fittings 514. The aft pivot fittings 514 are fixedly attached to the drogue container 424. When the drogue container rods 512 rotate downward, the aft pivot ends 514 are rotated rearward due to the fixed length of the drogue container rods 512 at a rate that approximately maintains the orientation of the drogue container 424.

The actuation mechanism housing 420 may be attached and detached to and from the aircraft fuselage 112 using bolts or other fasteners. Embodiments may include permanently installed structural attachment features (not shown) on the aircraft fuselage 112 to which the actuation mechanism housing 420 may be temporarily attached for use when refueling operations are desired. It should be appreciated that the drogue extension tube 422 provides a passageway for the refueling hose 304 and may be sized and shaped accordingly. Similarly, the drogue container 424 provides a stowage location for the drogue 302. The drogue container 424 may be configured to completely encompass the drogue 302 such that the drogue 302 is positioned entirely inside the drogue container 424 when stowed. Alternatively, the drogue container 424 may be configured to partially house the drogue 302 such that at least a portion of the drogue 302 abuts the drogue 302 but remains partially outside of the drogue container 424 when stowed.

Figure 6:
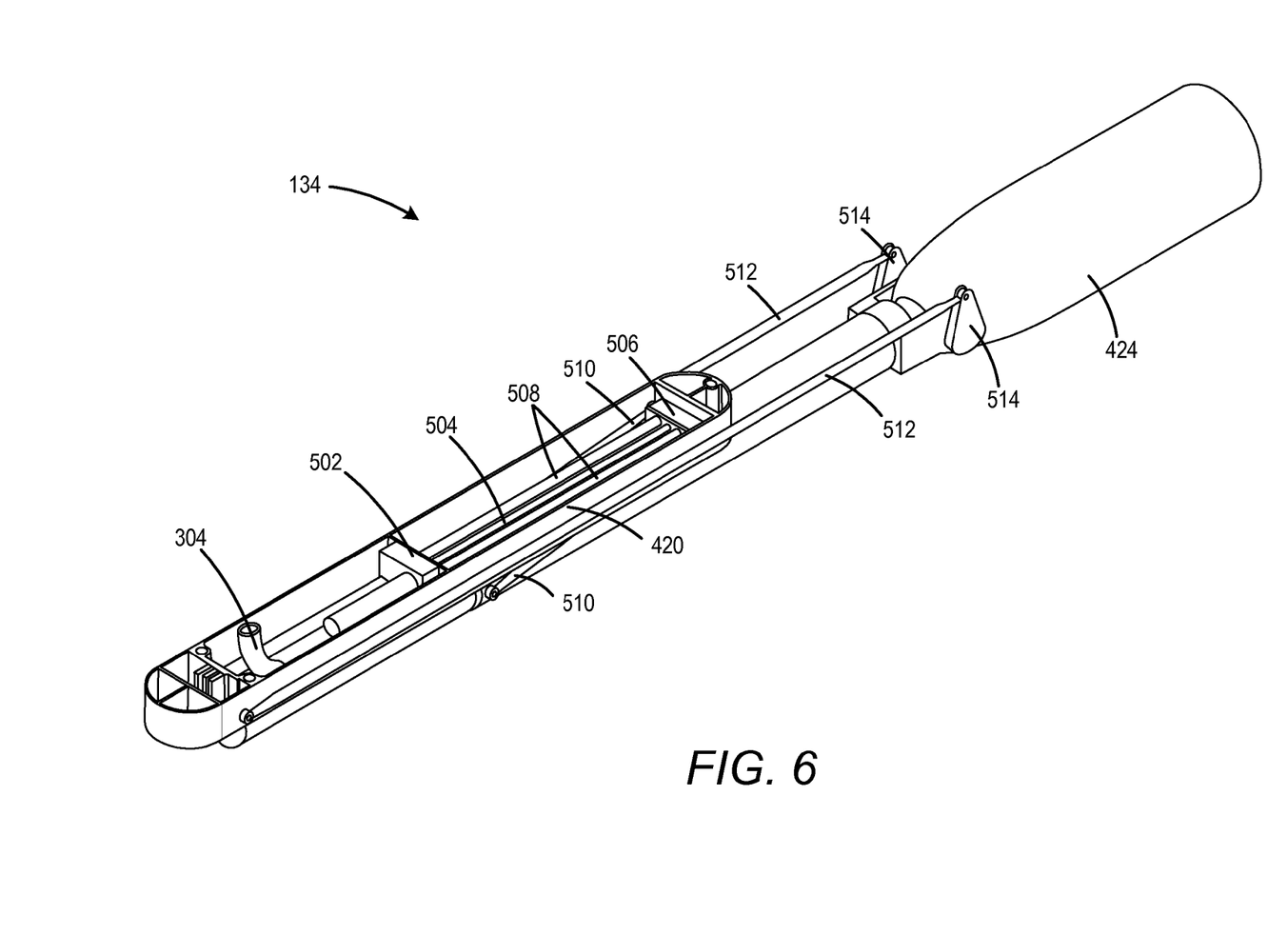
FIG. 6 is a perspective view of a drogue deployment unit in a stowed configuration according to various embodiments presented herein.

FIG. 6 shows a perspective view of the drogue deployment unit 134 in the stowed configuration. As seen here, the carriage assembly 506 is positioned at the ends of the guide rods 508 opposite the actuator 502. When the drogue deployment unit 134 is in the deployed configuration as shown in FIG. 5 and the actuator 502 is activated, the drive screw 504 rotates in a direction that moves the carriage assembly 506 along the guide rods 508 away from the actuator 502. Doing so pulls on the extension rods 510 connected to the carriage assembly 506, pulling the drogue extension tube 422 upward to the stowed configuration.

Figure 7:
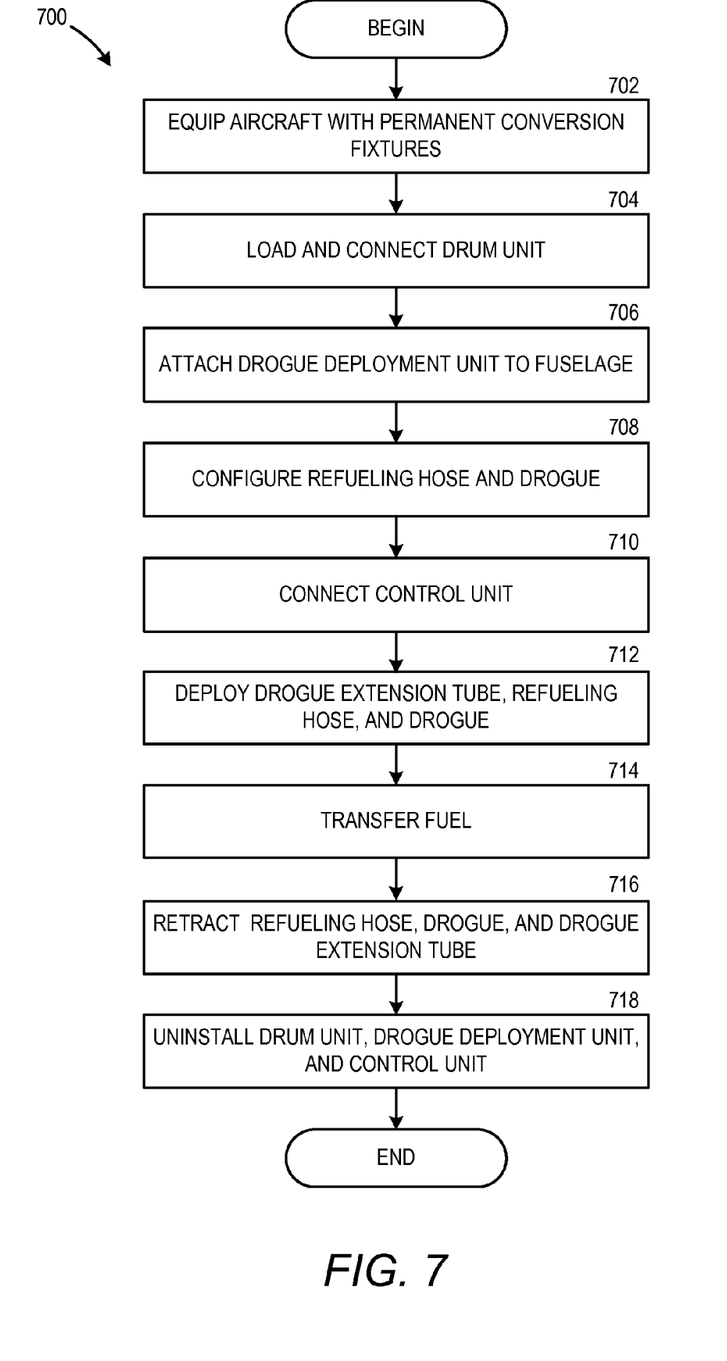
FIG. 7 is a flow diagram showing a method of providing aerial refueling operations with a non-tanker aircraft according to various embodiments presented herein.

Turning now to FIG. 7, an illustrative routine 700 for providing aerial refueling operations with a non-tanker aircraft will now be described in detail. It should be appreciated that more or fewer operations may be performed than shown in the figures and described herein. These operations may also be performed in a different order than those described herein.

The routine 700 begins at operation 702, where any permanent conversion fixtures are installed within the aircraft 102 to facilitate the temporary conversions of the aircraft 102 to and from aerial refueling operational configurations. Examples of these permanent conversion fixtures may include the single-walled fuel manifold 410 and corresponding shutoff valve 412 and vacuum relief check valve 414 discussed above, which provides fuel from the aircraft fuel tanks 126 to the drum unit 132 when the drum unit 132 is installed within the cargo space. Another example of a permanent conversion fixture may be the attachment hardware on the exterior surface of the fuselage 112 that allows for the temporary connection of the drogue deployment unit 134 during aerial refueling operations. Further examples may include any electrical and communications cables between the cargo area or other installation area of the drogue deployment system 130 and the cockpit or other desired location in which the ARO will be conducting inflight refueling operations From operation 702, the routine 700 continues to operation 704, where the drum unit 132 is loaded into the cargo space of the aircraft 102, secured in place, and attached to the fuel system 124 of the aircraft 102 via the appropriate permanent conversion fixtures described above. According to one embodiment, this connection may be made between the permanent single-walled fuel manifold 410 of the unpressurized space of the aircraft 102 and the temporary double-walled fuel manifold 408 of the drum unit 132. The routine 700 continues to operation 706, where the drogue deployment unit 134 is attached to the fuselage 112 via the appropriate permanent conversion fixtures. According to one embodiment, the actuation mechanism housing 420 is bolted onto the underside of the fuselage 112.

From operation 706, the routine 700 continues to operation 708, where the refueling hose 304 is routed from the drum 404 through the actuator mechanism housing 420, drogue extension tube 422, and drogue container 424. The drogue 302 is coupled to the end of the refueling tube 304 and positioned within the drogue container 424. At operation 710, the control unit 136 is coupled to the applicable control components of the drogue deployment system 130. As discussed above, the control unit 136 may include the appropriate input devices and corresponding computer hardware and software housed within a "suitcase" or other portable housing. This suitcase-style control unit may be carried into the cockpit or other desired location on the aircraft 102 and connected to the electrical and communication cables that are coupled to the corresponding components of the drogue deployment system 130.

The routine 700 continues from operation 710 to operation 712, where the ARO, via the control unit 136, deploys the drogue extension tube 422 and the refueling hose 304 with drogue 302 during flight and transfers fuel at operation 714 when a receiving aircraft flies a corresponding refueling probe into the drogue 302. After refueling operations are concluded, the ARO utilizes the control unit 136 to retract the refueling hose 304 with drogue 302, followed by the drogue extension tube 422 at operation 716. When it is desirable to return the aircraft 102 to a configuration for primary use for carrying passengers or cargo, then at operation 718, the drum unit 132, drogue deployment unit 134, and control unit 136 are uninstalled from the aircraft 102 and stored for future use as desired, and the routine 700 ends.

Figure 8:
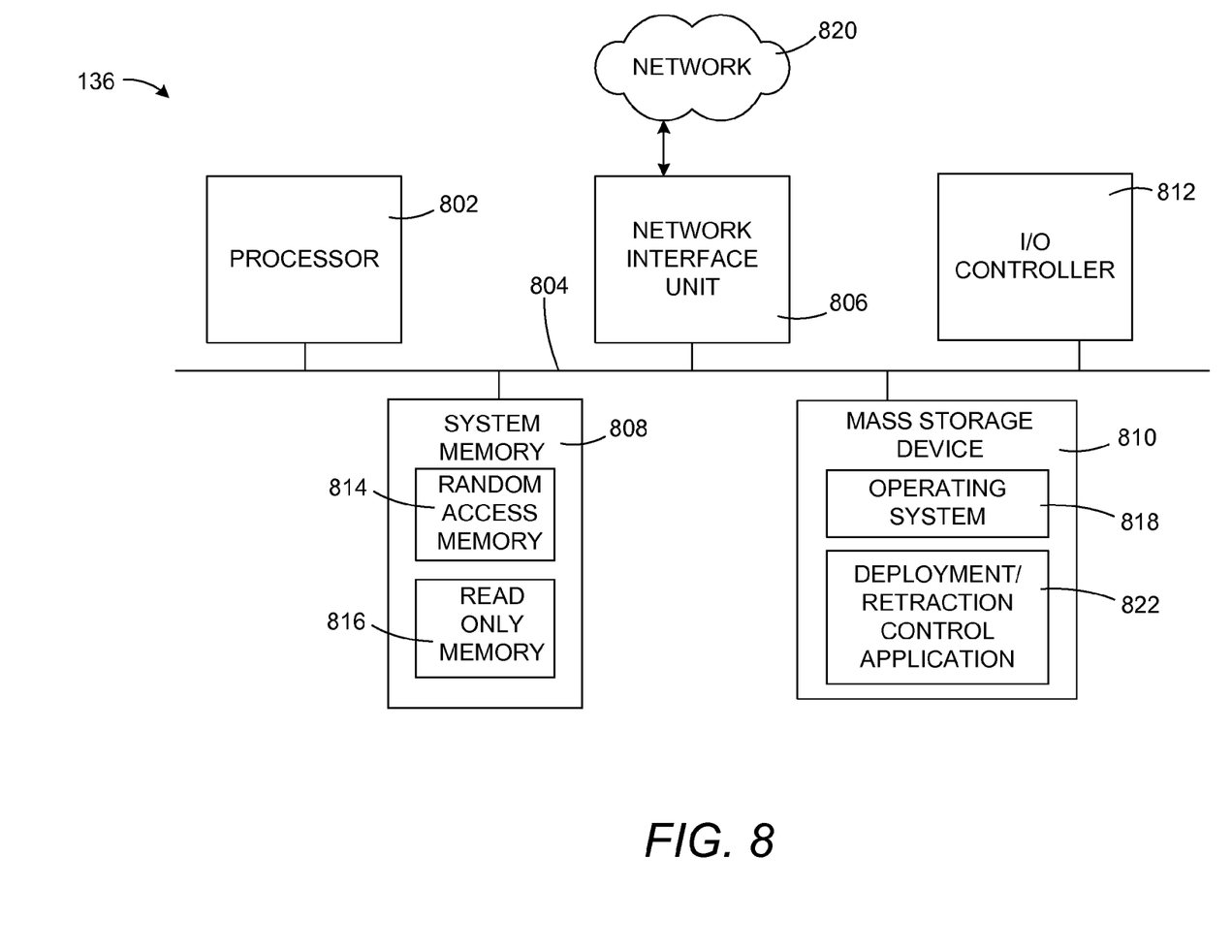
FIG. 8 is a computer architecture diagram showing an illustrative computer hardware and software architecture for a computing system capable of implementing the embodiments presented herein.

FIG. 8 shows an illustrative computer architecture for a control unit 136 capable of executing the software components described herein for providing aerial refueling operations. The computer architecture shown in FIG. 8 illustrates a conventional desktop, laptop computer, server computer, or any flight computer configured for use with an aircraft system and may be utilized to implement the control unit 136 and to execute any of the other software components described herein.

The computer architecture shown in FIG. 8 includes a processor 802, a system memory 808, including a random access memory 814 (RAM) and a read-only memory (ROM) 816, and a system bus 804 that couples the memory to the processor 802. A basic input/output system (BIOS) containing the basic routines that help to transfer information between elements within the control unit 136, such as during startup, is stored in the ROM 816. The control unit 136 further includes a mass storage device 810 for storing an operating system 818, application programs, and other program modules, which will be described in greater detail below.

The mass storage device 810 is connected to the processor 802 through a mass storage controller (not shown) connected to the bus 804. The mass storage device 810 and its associated computer-readable media provide non-volatile storage for the control unit 136. Although the description of computer-readable media contained herein refers to a mass storage device, such as a hard disk or CD-ROM drive, it should be appreciated by those skilled in the art that computer-readable storage media can be any available computer storage media that can be accessed by the control unit 136.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the control unit 136. As used herein, the term computer-readable storage media does not encompass transitory signals.

According to various embodiments, the control unit 136 may operate in a networked environment using logical connections to remote computers through a network such as the network 820. The control unit 136 may connect to the network 820 through a network interface unit 806 connected to the bus 804. It should be appreciated that the network interface unit 806 may also be utilized to connect to other types of networks and remote computer systems. The control unit 136 may also include an input/output controller 812 for receiving and processing input from a number of other devices, including a keyboard, mouse, joystick, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the control unit 136, including an operating system 818 suitable for controlling the operation of a networked desktop, laptop, server, or other flight computer. The mass storage device 810 and RAM 814 may also store one or more program modules. In particular, the mass storage device 810 and the RAM 814 may store a deployment/retraction control application 822 executable to control the applicable components of the drogue deployment system 130 as described above. The mass storage device 810 and RAM 814 may also store other program modules and data.

In general, software applications or modules may, when loaded into the processor 802 and executed, transform the processor 802 and the overall control unit 136 from a general-purpose computing system into a special-purpose computing system customized to perform the functionality presented herein. The processor 802 may be constructed from any number of transistors or other discrete circuit elements, which may individually or collectively assume any number of states. More specifically, the processor 802 may operate as one or more finite-state machines, in response to executable instructions contained within the software or modules. These computer-executable instructions may transform the processor 802 by specifying how the processor 802 transitions between states, thereby physically transforming the transistors or other discrete hardware elements constituting the processor 802.

Encoding the software or modules onto a mass storage device may also transform the physical structure of the mass storage device or associated computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer-readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A drogue deployment system for providing a non-tanker aircraft with aerial refueling capabilities, comprising:
 a drum unit configured for removable coupling to a fuel system of the non-tanker aircraft, the drum unit comprising a drum configured to rotate in a first direction to receive a refueling hose and to rotate in a second direction to deploy the refueling hose; and
 an actuator operative to rotate a drive screw,
 at least one guide rod positioned substantially parallel to the drive screw;
 a carriage assembly configured to translate along the at least one guide rod in a first linear direction upon activation of the actuator to rotate the drive screw in a first rotational direction, and to translate along the at least one guide rod in a second linear direction opposite the first linear direction upon activation of the actuator to rotate the drive screw in a second rotational direction opposite the first rotational direction,
 a drogue extension tube rotatably coupled to a fixed structure at a fixed pivot end,
 at least one extension rod coupled at a first end to the carriage assembly and at a second end to the drogue extension tube such that translation of the carriage assembly along the at least one guide rod rotates the drogue extension tube around the fixed pivot end, and
 a drogue container rotatably coupled to the drogue extension tube at a distal end opposite the fixed pivot end,
 wherein the drogue extension tube and the drogue container are configured to receive the refueling hose and to guide the refueling hose from the drum unit to a deployed position external to the non-tanker aircraft.

2. The drogue deployment system of claim 1, further comprising:

a drogue coupled to the refueling hose and configured to receive a refueling probe of a receiving aircraft and to provide fuel from the refueling hose to the refueling probe.

3. The drogue deployment system of claim 2, further comprising:
the refueling hose configured for coupling at one end to a fuel line fitting of the drum unit and at an opposing end to the drogue.

4. The drogue deployment system of claim 1, wherein the drum unit further comprises a housing encompassing the drum and configured for stowage on an aircraft pallet.

5. The drogue deployment system of claim 1, wherein the drum unit further comprises a drum actuation mechanism operative to selectively rotate the drum in the first direction and in the second direction, and wherein the actuator of the drogue deployment unit is operative to selectively rotate the drogue extension tube downward to a deployed configuration and upward to a stowed configuration.

6. The drogue deployment system of claim 5, further comprising a control unit, the control unit operative to selectively activate and deactivate the drum actuation mechanism and the actuator of the drogue deployment unit.

7. The drogue deployment system of claim 1, wherein the drogue deployment unit further comprises:
a drogue container rod rotatably attached at a first end to the fixed structure and at a second end to an aft pivot fitting; and
the aft pivot fitting fixedly attached to the drogue container such that when the drogue container rod rotates downward around the first end, the drogue container rod rotates the aft pivot fitting and attached corresponding drogue container at a rate that substantially maintains an orientation of the drogue container with respect to an ambient airflow.

8. The drogue deployment system of claim 1, wherein the drum unit being configured for removable coupling to the fuel system of the non-tanker aircraft comprises the drum unit having an attached double-walled fuel manifold that is configured to be removably coupled to a single-walled fuel manifold of the fuel system of the non-tanker aircraft.

9. The drogue deployment system of claim 1, further comprising:
the fuselage of the non-tanker aircraft;
the refueling hose; and
a drogue attached at an end of the refueling hose and configured to receive a refueling probe of a receiving aircraft,
wherein the drum unit is secured within a cargo space of the fuselage, and wherein the fuel system comprises at least one fuel tank such that the fuel system and drogue deployment system provide a fuel pathway from the at least one fuel tank to the drogue for transfer to the receiving aircraft.

10. A method for providing aerial refueling operations with a non-tanker aircraft, the method comprising:
rotating a drive screw of a drogue deployment unit;
in response to rotating the drive screw, translating a carriage assembly along at least one guide rod positioned substantially parallel to the drive screw to rotate a drogue extension tube downward around a fixed pivot end from a stowed position substantially parallel with a fuselage of the non-tanker aircraft to a deployed position via at least one extension rod, wherein the at least one extension rod is coupled at a first end to the carriage assembly and at a second end to the drogue extension tube such that translation of the carriage assembly along the at least one guide rod rotates the drogue extension tube around the fixed pivot end;
extending a refueling hose from a drum unit secured within a cargo area of the non-tanker aircraft through the drogue extension tube and through a drogue container attached to a distal end of the drogue extension tube such that a drogue attached to an end of the refueling hose extends rearward from the drogue container to a deployed position behind the non-tanker aircraft; and
transferring fuel from a fuel tank of the non-tanker aircraft through the refueling tube to the drogue for receiving by a refueling probe of a receiving aircraft.

11. The method of claim 10, wherein rotating the drogue extension tube downward, extending the refueling hose from the drum unit, and transferring fuel from the fuel tank are initiated via a portable control unit positioned within the non-tanker aircraft.

12. The method of claim 10, further comprising:
stopping fuel transfer;
retracting the refueling hose; and
rotating the drogue extension tube upward around the fixed pivot end from the deployed position to the stowed position.

13. The method of claim 10, further comprising:
coupling the drum unit to the fuel tank of the non-tanker aircraft, the drum unit comprising a drum configured to rotate in a first direction to retract the refueling hose and to rotate in a second direction to extend the refueling hose;
coupling a drogue deployment unit to an external surface of the fuselage of the non-tanker aircraft, the drogue deployment unit comprising the drogue extension tube and the drogue container;
positioning the refueling hose around the drum and through the drogue extension tube;
attaching the drogue to the refueling hose; and
coupling a portable control unit to the drum unit and to the drogue deployment unit, the control unit configured to control deployment and retraction of the drogue extension tube and the refueling hose and to control fuel flow from the fuel tank of the non-tanker aircraft to the drogue.

14. The method of claim 13, wherein coupling the drum unit to the fuel tank of the non-tanker aircraft comprises removably coupling a double-walled fuel manifold attached to the drum unit to a single-walled fuel manifold attached to the fuel tank of the non-tanker aircraft.

15. The method of claim 14, further comprising securing the drum unit within the cargo area of the non-tanker aircraft.

16. An aircraft configuration, comprising:
a fuselage comprising a pressurized cargo area;
wings coupled to the fuselage;
a fuel system comprising a plurality of fuel tanks disposed within the fuselage or the wings;
a drum unit removably coupled to the fuel system, the drum unit comprising a drum configured to rotate in a first direction to receive a refueling hose and to rotate in a second direction to deploy the refueling hose;
a drogue deployment unit, the drogue deployment unit comprising
an actuation mechanism housing removably coupled to an external surface of the fuselage,
an actuator positioned within the actuation mechanism housing and operative to rotate a drive screw,
at least one guide rod positioned substantially parallel to the drive screw;

a carriage assembly configured to translate along the at least one guide rod in a first linear direction upon activation of the actuator to rotate the drive screw in a first rotational direction, and to translate along the at least one guide rod in a second linear direction opposite the first linear direction upon activation of the actuator to rotate the drive screw in a second rotational direction opposite the first rotational direction, a drogue extension tube rotatably coupled to the actuation mechanism housing at a pivot end, at least one extension rod coupled at a first end to the carriage assembly and at a second end to the drogue extension tube such that translation of the carriage assembly along the at least one guide rod rotates the drogue extension tube around the fixed pivot end, and a drogue container rotatably coupled to the drogue extension tube at a distal end opposite the pivot end, wherein the drogue extension tube and the drogue container are configured to receive the refueling hose and to guide the refueling hose from the drum unit to a deployed position beneath and rearward of the fuselage;

the refueling hose;

a drogue attached to an end of the refueling hose and configured to receive a refueling probe of a receiving aircraft; and a control unit, the control unit operative to control deployment and retraction of the drogue extension tube and of the refueling hose.

17. The aircraft configuration of claim 16, wherein the drogue deployment unit further comprises:

a drogue container rod rotatably attached at a first end to the fixed structure and at a second end to an aft pivot fitting; and the aft pivot fitting fixedly attached to the drogue container such that when the drogue container rod rotates downward around the first end, the drogue container rod rotates the aft pivot fitting and attached corresponding drogue container at a rate that substantially maintains an orientation of the drogue container with respect to an ambient airflow.

18. The aircraft configuration of claim 16, wherein the drum unit comprises a double-walled fuel manifold that is configured to be removably coupled to a single-walled fuel manifold of the fuel system.

* * * * *